Figure 1:
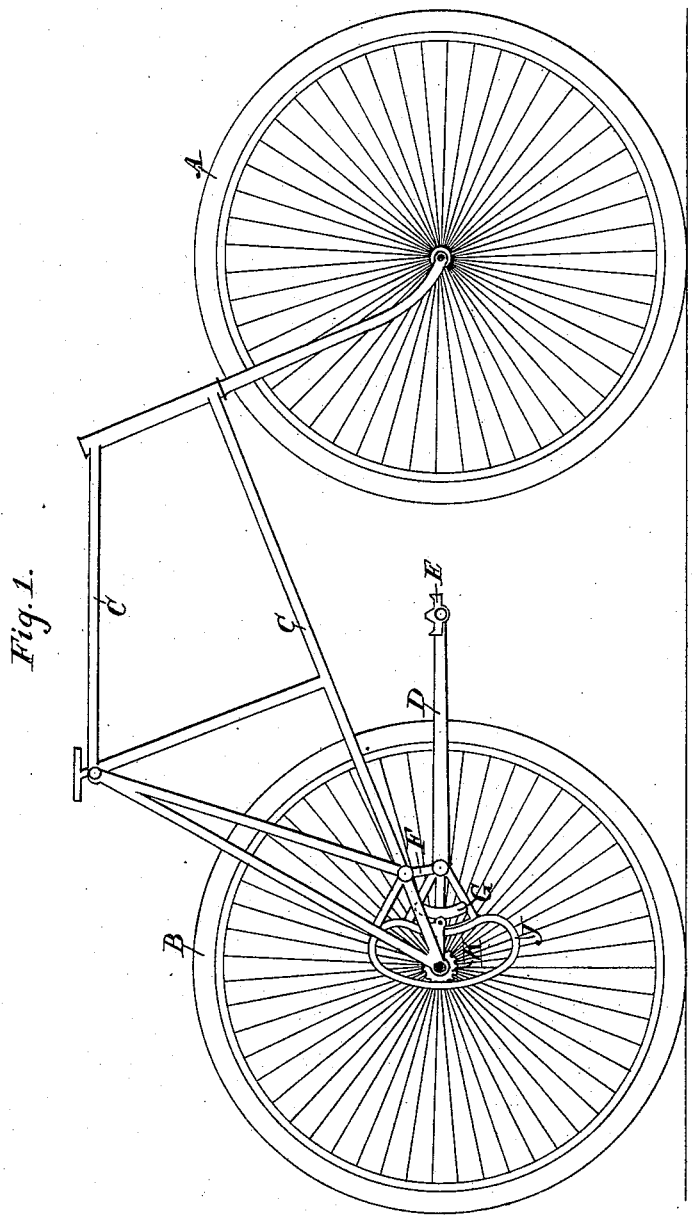

(No Model.) 2 Sheets—Sheet 1.

C. B. COFFEEN & C. F. BUCK.
BICYCLE.

No. 577,509. Patented Feb. 23, 1897.

Witnesses:
A. M. Belfield,
M. E. Beasley

Inventors:
Charles B. Coffeen
Carl F. Buck
by Hill & Hill
Att'ys.

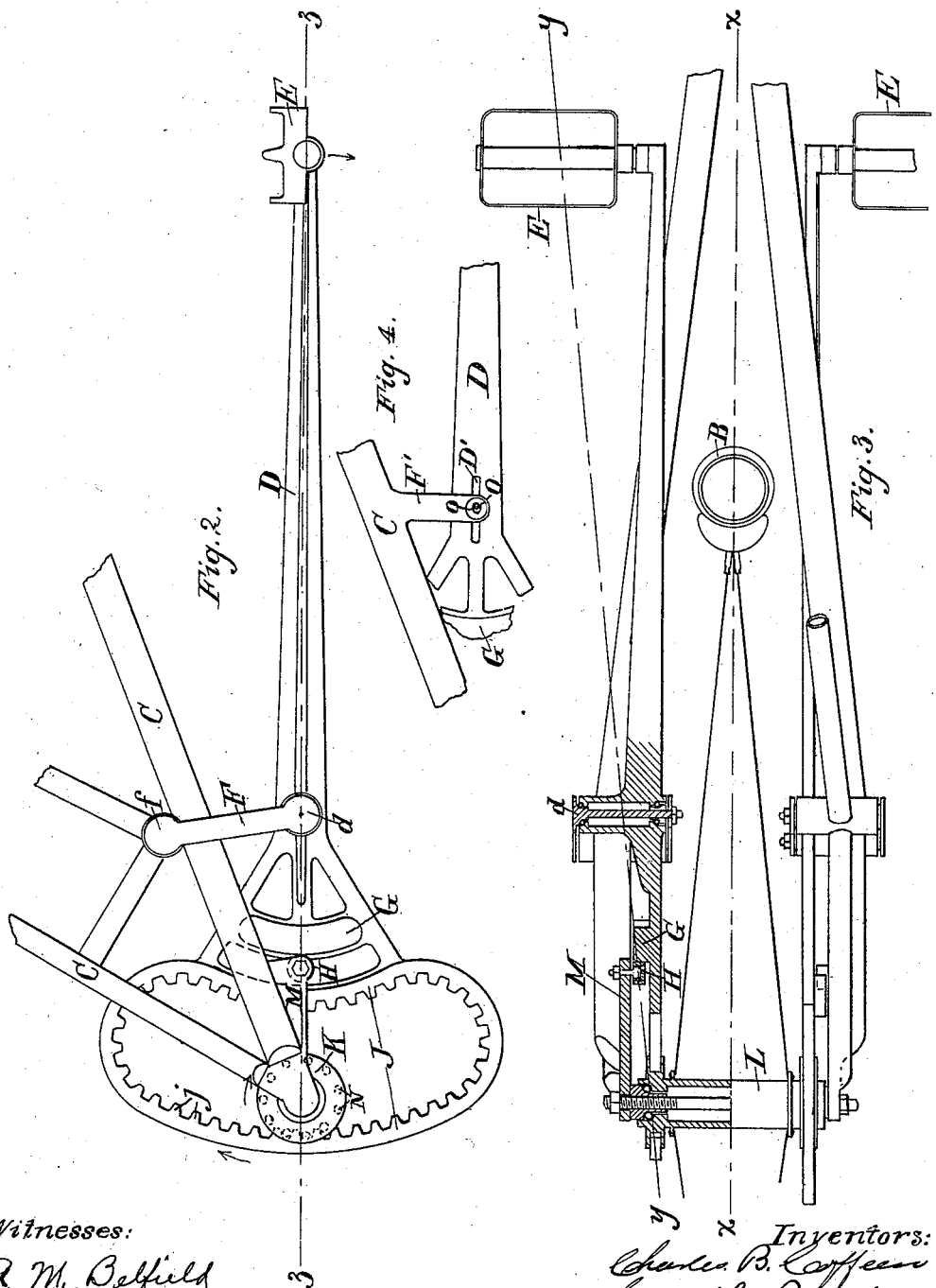

UNITED STATES PATENT OFFICE.

CHARLES B. COFFEEN AND CARL F. BUCK, OF CHICAGO, ILLINOIS.

BICYCLE.

SPECIFICATION forming part of Letters Patent No. 577,509, dated February 23, 1897.

Application filed September 10, 1895. Serial No. 562,085. (No model.)

*To all whom it may concern:*

Be it known that we, CHARLES B. COFFEEN and CARL F. BUCK, citizens of the United States of America, residing in Chicago, county of Cook, and State of Illinois, have invented certain new and useful Improvements in Bicycles, of which the following is a description, reference being had to the accompanying drawings, wherein like letters of reference indicate like or corresponding parts.

Referring to the accompanying drawings, Figure 1 is a side elevation of a bicycle provided with our improvement. Fig. 2 is a side view of our improved movement in detail as applied to a bicycle. Fig. 3 shows two views in horizontal plane. The portion above the line $x\,x$ is a horizontal section of one side of a bicycle in line 3 3 of Fig. 2, looking upward. The part below said line $xx$ is a top plan of the other side of the machine, looking downward. Fig. 4 is a modification of the fulcrum-support.

The object of our invention is to secure greater power for the rider with less or at least no more exertion on his part, and at the same time dispense with the use of sprocket-wheels and chain.

To this end our invention consists in the novel construction and combination of parts shown and described, and more particularly pointed out in the claims.

In the drawings, A represents the front wheel, and B the rear wheel, of a bicycle, connected by suitable framework C.

D is a lever supporting upon its front end a pedal E and terminating at its rear end in an internally-geared yoke J, the vertical sides of which are preferably arcs of circles having the point $d$ as center, but may be any preferred shape. The lever D is suspended from the frame of the bicycle, preferably by a swinging arm F, pivotally connected at $f$ to the frame and at $d$ to the lever, and thus acts as the fulcrum.

Projecting, preferably, from the side of the lever is a cam-guide G, similar in form to the yoke J, which is in contact with the guide-wheel H, mounted on the extension M of the frame. The teeth $j$ of the yoke J are thus constantly held in mesh with the pinion K, secured to the driving-wheel B. The parts G and H may obviously be reversed, if preferred, placing the wheel H on the lever and the cam G on the frame, without departing from the spirit of our invention.

We prefer to give the bearing at $d$ as wide a support as practicable, as shown in Fig. 3. As thus constructed a line passing through the point where the power is exerted by the ball of the foot and the yoke J will pass through the bearing at $d$, thus preventing undue canting or twisting of the lever. (See line $y\,y$, Fig. 3.)

The mode of operation is apparent. In all cases where the outer end of the lever is given a positive movement each way the pinion K will be rotated continuously by reason thereof, the guiding device keeping the parts constantly in mesh, the swinging support of the lever permitting the necessary longitudinal movement. In a bicycle or similar device, however, it is desirable to operate the lever one way simply, and that downward, by the weight or force put upon it by the rider. The upward movement of the lever is therefore caused by the momentum or continued rotation of the pinion K. We therefore duplicate the parts, placing one on each side of the wheel B and arranging or timing the levers in such a manner as to regularly alternate in their rise and fall, as is now common to the treadles of such devices. It will thus be seen that when one lever is at its lowest limit the other is at its upper limit, and the rider thus constantly forces the rotation of the pinions K and the consequent forward movement of the device, the pedals alternately rising and falling, as usual.

In applying our improved movement to a bicycle we prefer to make either the yoke J or the pinion K of two plates secured together at regular intervals by rods or rollers N. (See Fig. 2.) The cogs of the other member fit into the spaces between the rods, and the plates overlap the cogged member, preventing displacement.

Any foreign substance, as dirt, gravel, or the like, becoming entangled between the members is not held, but falls out between the rods and thus prevents clogging.

In some uses it may be desirable to replace the swinging support of the lever by other means, retaining, however, means for allowing the longitudinal movement of the lever.

Having thus described our invention, what we claim as new, and desire to secure by Letters Patent, is—

1. In combination, a bicycle tricycle or similar device provided on either side with a lever fulcrumed at a point between its ends by means of a swinging bar supported by the frame, and terminating at the front end in a pedal and at the rear end in an internally-geared yoke, a pinion secured to the rear wheel and located within the yoke and in mesh therewith, and a guide adapted to keep the yoke constantly in mesh with the pinion.

2. In combination, a bicycle tricycle or similar device provided on either side with a lever fulcrumed at a point between its ends by means of a swinging bar supported by the frame, and terminating at the front end in a pedal and at the rear end in an internally-geared yoke, a pinion secured to the rear wheel and located within the yoke and in mesh therewith, and a guide adapted to keep the yoke constantly in mesh with the pinion, the arrangement on the two sides of the bicycle being so timed that when one pedal is at its highest limit the other is at its lowest, substantially as described.

CHAS. B. COFFEEN.
CARL F. BUCK.

Witnesses:
A. M. BELFIELD,
JOHN W. HILL.